(12) United States Patent
Mao et al.

(10) Patent No.: US 10,284,931 B2
(45) Date of Patent: May 7, 2019

(54) LIQUID CRYSTAL GRATING-BASED OPTICAL SWITCH

(71) Applicant: Huawei Technologies Co., Ltd., Shenzhen (CN)

(72) Inventors: Chongchang Mao, Wuhan (CN); Minchun Li, Wuhan (CN); Sichao Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 285 days.

(21) Appl. No.: 15/346,540

(22) Filed: Nov. 8, 2016

(65) Prior Publication Data

US 2017/0055051 A1    Feb. 23, 2017

Related U.S. Application Data

(63) Continuation of application No. PCT/CN2014/090051, filed on Oct. 31, 2014.

(30) Foreign Application Priority Data

May 9, 2014   (CN) .......................... 2014 1 0195044

(51) Int. Cl.
*G02B 6/27* (2006.01)
*G02B 6/35* (2006.01)
(Continued)

(52) U.S. Cl.
CPC ......... *H04Q 11/0005* (2013.01); *G02F 1/137* (2013.01); *G02F 1/31* (2013.01); *H04B 10/25* (2013.01); *H04J 14/06* (2013.01); *G02B 6/272* (2013.01); *G02B 6/2713* (2013.01); *G02B 6/3594* (2013.01); *G02B 6/42* (2013.01); (Continued)

(58) Field of Classification Search
CPC .......... H04B 10/25751; H04B 10/2575; H04B 10/27; H04B 10/40; H04B 10/808; H04J 14/0246; H04J 14/025; H04J 3/1694; G02B 6/2931; G02B 6/42; G02B 6/272; (Continued)

(56) References Cited

U.S. PATENT DOCUMENTS 5,187,487 A * 2/1993 Riza ..................... H01Q 3/2676
342/368
5,648,859 A * 7/1997 Hirabayashi ......... G02B 27/283
349/196

(Continued)

FOREIGN PATENT DOCUMENTS

CN    1387060 A    12/2002
CN    102169271 A    8/2011
(Continued)

*Primary Examiner* — Kenneth N Vanderpuye
*Assistant Examiner* — Abbas H Alagheband
(74) *Attorney, Agent, or Firm* — Slater Matsil, LLP

(57) ABSTRACT

Embodiments of the present invention provide a liquid crystal grating-based optical switching apparatus, including an input collimator, an input polarization beam splitter, an input quarter-wave plate, a liquid crystal grating, an output quarter-wave plate, an output polarization beam splitter, and an output collimator. A transmission path is selected for an optical signal by changing a voltage of a liquid crystal grating so that the optical signal is output to a selected output.

14 Claims, 8 Drawing Sheets

(51) Int. Cl.
  *G02B 6/42* (2006.01)
  *G02F 1/31* (2006.01)
  *G02F 1/137* (2006.01)
  *H04B 10/25* (2013.01)
  *H04J 14/06* (2006.01)
  *H04Q 11/00* (2006.01)

(52) U.S. Cl.
  CPC ............... *H04Q 2011/0015* (2013.01); *H04Q 2011/0026* (2013.01); *H04Q 2011/0035* (2013.01); *H04Q 2011/0039* (2013.01); *H04Q 2011/0052* (2013.01)

(58) Field of Classification Search
  CPC ....... G02B 6/2713; G02B 6/3594; G02F 1/31; G02F 1/13363; H04Q 11/0005
  USPC ...................... 398/45, 116, 66, 81
  See application file for complete search history.

(56) References Cited

U.S. PATENT DOCUMENTS

| | | | | |
|---|---|---|---|---|
| 7,058,251 B2* | 6/2006 | McGuire, Jr. | .......... | G02B 6/272 359/290 |
| 7,360,899 B2* | 4/2008 | McGuire, Jr. | ...... | G02B 27/0101 348/759 |
| 7,499,608 B1* | 3/2009 | Kelly | .................. | G02B 6/2931 349/193 |
| 7,519,247 B2* | 4/2009 | McGuire, Jr. | .......... | G02B 6/272 359/290 |
| 7,573,563 B2* | 8/2009 | Yamazoe | .................. | G01J 4/04 355/53 |
| 7,822,303 B2* | 10/2010 | Cohen | .................. | G02B 6/2713 385/11 |
| 7,909,958 B2* | 3/2011 | Washburn | ............ | G02B 6/2931 156/272.2 |
| 8,078,019 B2* | 12/2011 | Cohen | .................. | G02B 6/2713 385/11 |
| 9,008,470 B2* | 4/2015 | Mao | .................. | G02F 1/133528 385/8 |
| 9,335,586 B2* | 5/2016 | Escuti | .................. | G02F 1/13363 |
| 2005/0063056 A1* | 3/2005 | Kralik | ................ | H04Q 11/0005 359/484.06 |
| 2009/0073331 A1* | 3/2009 | Shi | .......... | G02F 1/292 349/18 |
| 2010/0054103 A1* | 3/2010 | Tatsuta | .................... | G03H 1/26 369/103 |
| 2010/0220577 A1* | 9/2010 | Katayama | ............ | G11B 7/1369 369/112.16 |
| 2012/0147331 A1* | 6/2012 | Miyazaki | ........... | G02B 19/0057 353/31 |
| 2012/0188467 A1* | 7/2012 | Escuti | .................. | G02B 27/286 349/1 |
| 2013/0335683 A1* | 12/2013 | Escuti | .................. | G02F 1/133528 349/96 |
| 2015/0185583 A1* | 7/2015 | Mao | .................. | G02F 1/133528 349/196 |

FOREIGN PATENT DOCUMENTS

| | | |
|---|---|---|
| CN | 102221728 A | 10/2011 |
| CN | 102590953 A | 7/2012 |
| CN | 102725683 A | 10/2012 |
| CN | 103703405 A | 4/2014 |
| JP | H0792507 A | 4/1995 |
| JP | 2012505430 A | 3/2012 |
| JP | 5276045 B2 | 8/2013 |
| JP | 2015505995 A | 2/2015 |
| WO | 2007029260 A3 | 3/2007 |

* cited by examiner

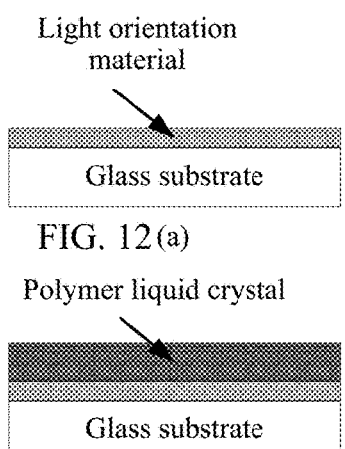
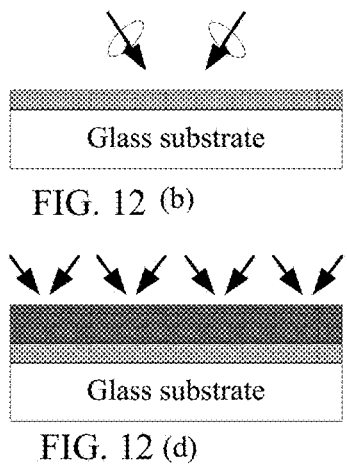
FIG. 12(a) — Light orientation material / Glass substrate
FIG. 12(b) — Glass substrate
FIG. 12(c) — Polymer liquid crystal / Glass substrate
FIG. 12(d) — Glass substrate
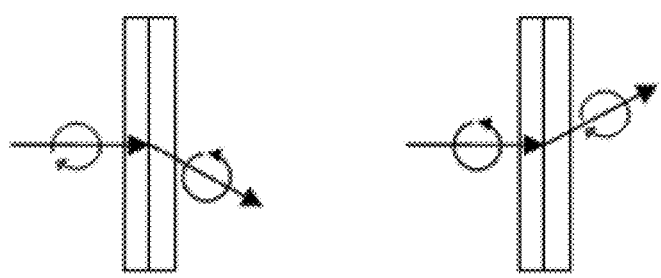
FIG. 13

LIQUID CRYSTAL GRATING-BASED OPTICAL SWITCH

CROSS-REFERENCE TO RELATED APPLICATIONS

This application is a continuation of International Application No. PCT/CN2014/090051, filed on Oct. 31, 2014, which claims priority to Chinese Patent Application No. 201410195044.4, filed on May 9, 2014, the disclosures of the aforementioned applications are hereby incorporated by reference in their entireties.

TECHNICAL FIELD

The present invention relates to the communications field, and in particular, to a liquid crystal grating-based optical switch.

BACKGROUND

In an existing communications network that is based on a wavelength division multiplexing (WDM) technology, to complete optical-electrical-optical conversion, each node in the network still uses a manner of processing information by using an electrical signal to exchange signals. With respect to meeting high-speed and large-capacity requirements, an electronic component in each node has disadvantages such as a bandwidth limitation, a clock offset, serious crosstalk, and high power consumption; as a result, a phenomenon of an "electronic bottleneck" arises in the communications network. To solve this problem, people propose an All-Optical Network (AON) concept. An All-Optical Network has become a first choice in next-generation high-speed broadband networks because of good transparency, wavelength routing feature, compatibility, and scalability.

An optical cross connection (OXC) is a core component in the all-optical network. The optical cross connection and components and devices such as an optical add/drop multiplexer (OADM), an erbium-doped fiber amplifier (EDFA), an attenuator, and an optical fiber form the all-optical network. The OXC exchanges an all-optical signal, and the OXC interconnects specified wavelengths on a network node, so that a wavelength resource is utilized effectively, and wavelength reuse is implemented, that is, a small quantity of wavelengths are used to interconnect a large quantity of network nodes. When the optical fiber is interrupted or a service fails, the OXC can automatically complete operations such as fault isolation, route reselection, and network reconfiguration, so that the service is not interrupted. That is, the OXC has functions such as route selection for a high-speed optical signal and network recovery.

Currently in the market, there is an OXC that is based on a liquid crystal (LC) and a polarization beam splitter (PBS). As shown in FIG. 1, the OXC mainly includes an optical collimator, a displayer, a PBS array, and an LC array. The optical collimator is configured to input and output light, the displayer is configured to convert the input light into same polarized light and couple polarized light from an output end into the optical collimator, the PBS array is configured to split and combine the polarized light, and the LC array is configured to control a polarization direction of the light. A polarization direction of the light on each node is controlled by controlling a voltage of the LC array, thereby implementing transmission of any beam of input light to a required output port. According to the technical solution, there is a great difficulty in assembly, a volume is large, and costs are high.

SUMMARY

Embodiments of the present invention provide a liquid crystal grating-based optical switch, so as to implement an optical cross interconnection by using a switchable polarization grating, and solve a technical problem in the prior art that, for an optical cross interconnection that is based on an LC array and a PBS array, there is a great difficulty in assembly, a volume is large, and costs are high.

According to a first aspect, an embodiment of the present invention provides an optical switching apparatus, including an input collimator and an output collimator, and further including an input polarization beam splitter, an input quarter-wave plate, an output quarter-wave plate, an output polarization beam splitter, and an N×N liquid crystal grating array, where N is an integer greater than or equal to 2.

The input polarization beam splitter is disposed between the input collimator and the input quarter-wave plate, and is configured to split an input optical signal from the input collimator into two optical signals having different polarization directions, and output, to the input quarter-wave plate, the two optical signals having different polarization directions.

The input quarter-wave plate is disposed between the input polarization beam splitter and the N×N liquid crystal grating array, and is configured to: receive the two optical signals having different polarization directions from the input polarization beam splitter, couple the two optical signals having different polarization directions into circularly polarized light, and output the circularly polarized light to the N×N liquid crystal grating array.

The N×N liquid crystal grating array is disposed between the input quarter-wave plate and the output quarter-wave plate, and is configured to: receive the circularly polarized light from the input quarter-wave plate by using a liquid crystal grating that is in the N×N liquid crystal grating array and that is corresponding to the input quarter-wave plate, and output the circularly polarized light to the selected output quarter-wave plate through a selected transmission path, where the selected transmission path is selected by setting a voltage for a liquid crystal grating in the N×N liquid crystal grating array.

The output quarter-wave plate is disposed between the N×N liquid crystal grating array and the output polarization beam splitter, and is configured to: split the circularly polarized light from the N×N liquid crystal grating array into two optical signals having different polarization directions, and output, to the output polarization beam splitter, the two optical signals having different polarization directions.

The output polarization beam splitter is disposed between the output quarter-wave plate and the output collimator, and is configured to couple, into the output collimator, the two optical signals having different polarization directions from the output quarter-wave plate.

In a first possible implementation manner of the first aspect, liquid crystal gratings in the N×N liquid crystal grating array include N×N switchable polarization gratings, N×N switchable polarization grating/liquid crystal plate combinations, N×N polymer polarization grating/liquid crystal plate/polymer polarization grating combinations, or N×N polymer polarization grating/liquid crystal plate/polymer polarization grating/liquid crystal plate combinations.

With reference to the first aspect or any possible implementation manner in the first possible implementation manner, in a second possible implementation manner, for any switchable polarization grating in the N×N switchable polarization gratings, when a voltage applied between both ends of the any switchable polarization grating is less than a first threshold voltage, liquid crystal molecules in the any switchable polarization grating form a liquid crystal grating to diffract incident light; or when a voltage between both ends of the any switchable polarization grating is greater than or equal to a first threshold voltage, the liquid crystal molecules deflect toward a direction of an electric field caused by the voltage between both ends of the any switchable polarization grating, and a grating effect disappears.

In the N×N switchable polarization gratings, a voltage between both ends of a switchable polarization grating that does not need to deflect the incident light is set to being greater than or equal to the first threshold voltage, and a voltage between both ends of a switchable polarization grating that needs to deflect the incident light is set to being less than the first threshold voltage, where the switchable polarization grating that needs to deflect the incident light is a switchable polarization grating that is corresponding to the input quarter-wave plate and corresponding to the output quarter-wave plate, and the switchable polarization grating that does not need to deflect the incident light is a switchable polarization grating, except the switchable polarization grating that needs to deflect the incident light, in an N×N switchable polarization grating array.

With reference to the second possible implementation manner of the first aspect, in a third possible implementation manner, the voltage between both ends of the switchable polarization grating that needs to deflect the incident light is set to zero.

With reference to the second or the third possible implementation manner of the first aspect, in a fourth possible implementation manner, when the voltage applied between both ends of the any switchable polarization grating is less than the first threshold voltage, the any switchable polarization grating has three diffraction levels: level 0, level +1, and level −1, incident right-handed circularly polarized light is diffracted by the any switchable polarized grating to the level +1 to change to left-handed circularly polarized light; and incident left-handed circularly polarized light is diffracted by the any switchable polarized grating to the level −1 to change to right-handed circularly polarized light.

With reference to any one of the second to the fourth possible implementation manners of the first aspect, in a fifth possible implementation manner, a circularly polarized state of output signal light is opposite to a circularly polarized state of output cross-talk light, where a polarized state of an optical signal incident into a liquid crystal plate is controlled by setting a voltage between both ends of the liquid crystal plate.

With reference to the fifth possible implementation manner of the first aspect, in a sixth possible implementation manner, when a voltage applied to any liquid crystal plate is less than a second threshold voltage, a polarized state of output light of the any liquid crystal plate is consistent with a polarized state of input light of the any liquid crystal plate; or when a voltage applied to the any liquid crystal plate is greater than or equal to a second threshold voltage, if the left-handed circularly polarized light is input to the any liquid crystal plate, the any liquid crystal plate outputs the right-handed circularly polarized light, and if the right-handed circularly polarized light is input to the any liquid crystal plate, the any liquid crystal plate outputs the left-handed circularly polarized light.

With reference to the fifth possible implementation manner of the first aspect, in a seventh possible implementation manner, when a voltage applied to the any liquid crystal plate is greater than or equal to a second threshold voltage, a polarized state of output light of the any liquid crystal plate is consistent with a polarized state of input light of the liquid crystal plate; or when a voltage applied to the any liquid crystal plate is less than a second threshold voltage, if the left-handed circularly polarized light is input to the any liquid crystal plate, the any liquid crystal plate outputs the right-handed circularly polarized light, and if the right-handed circularly polarized light is input to the any liquid crystal plate, the any liquid crystal plate outputs the left-handed circularly polarized light.

With reference to the first aspect or any possible implementation manner in the first possible implementation manner, in an eighth possible implementation manner, any polymer polarization grating/liquid crystal plate/polymer polarization grating combination includes a first polymer polarization grating, a first liquid crystal plate, and a second polymer polarization grating; both the first polymer polarization grating and the second polymer polarization grating are fixed gratings; if right-handed circularly polarized light is input, the right-handed circularly polarized light is diffracted by the first polymer polarization grating or the second polymer polarization grating to level +1 to output left-handed circularly polarized light, and if left-handed circularly polarized light is input, the left-handed circularly polarized light is diffracted by the first polymer polarization grating or the second polymer polarization grating to level −1 to output right-handed circularly polarized light; and the first liquid crystal plate is configured to control, by setting a voltage between both ends of the first liquid crystal plate, deflection of an optical signal incident into the liquid crystal plate.

With reference to the eighth possible implementation manner of the first aspect, in a ninth possible implementation manner, when the voltage applied to the first liquid crystal plate is greater than or equal to a second threshold voltage, if the left-handed circularly polarized light is input to the first liquid crystal plate, the first liquid crystal plate outputs the right-handed circularly polarized light, and if the right-handed circularly polarized light is input to the first liquid crystal plate, the first liquid crystal plate outputs the left-handed circularly polarized light; and a voltage between both ends of the first liquid crystal plate that does not need to deflect incident light is set to being less than the second threshold voltage, and a voltage between both ends of a first liquid crystal plate that needs to deflect incident light is set to being greater than or equal to the second threshold voltage, where the first liquid crystal plate that needs to deflect the incident light is the first liquid crystal plate that is corresponding to the input quarter-wave plate and corresponding to the output quarter-wave plate, and the first liquid crystal plate that does not need to deflect the incident light is a first liquid crystal plate, except the first liquid crystal plate that needs to deflect the incident light, in N×N first liquid crystal plate arrays.

With reference to the eighth possible implementation manner of the first aspect, in a tenth possible implementation manner, when the voltage applied to the first liquid crystal plate is less than a second threshold voltage, if the left-handed circularly polarized light is input to the first liquid crystal plate, the first liquid crystal plate outputs the right-handed circularly polarized light, and if the right-handed circularly polarized light is input to the first liquid crystal plate, the first liquid crystal plate outputs the left-handed circularly polarized light; and a voltage between both ends of the first liquid crystal plate that does not need to deflect incident light is set to being greater than or equal to the second threshold voltage, and a voltage between both ends of a first liquid crystal plate that needs to deflect incident light is set to being less than the second threshold voltage, where the first liquid crystal plate that needs to deflect the incident light is the first liquid crystal plate that is corresponding to the input quarter-wave plate and corresponding to the output quarter-wave plate, and the first liquid crystal plate that does not need to deflect the incident light is a first liquid crystal plate, except the first liquid crystal plate that needs to deflect the incident light, in N×N first liquid crystal plate arrays.

With reference to the eighth possible implementation manner of the first aspect, in an eleventh possible implementation manner, a circularly polarized state of output signal light is opposite to a circularly polarized state of output cross-talk light, where a polarized state of an optical signal incident into a second liquid crystal plate is controlled by setting a voltage between both ends of the second liquid crystal plate.

With reference to the eleventh possible implementation manner of the first aspect, in a twelfth possible implementation manner, when a voltage applied to any second liquid crystal plate is less than a second threshold voltage, a polarized state of output light of the any second liquid crystal plate is consistent with a polarized state of input light of the any second liquid crystal plate; or when a voltage applied to the any second liquid crystal plate is greater than or equal to a second threshold voltage, if the left-handed circularly polarized light is input to the any second liquid crystal plate, the any second liquid crystal plate outputs the right-handed circularly polarized light, and if the right-handed circularly polarized light is input to the any liquid crystal plate, the any second liquid crystal plate outputs the left-handed circularly polarized light.

With reference to the eleventh possible implementation manner of the first aspect, in a thirteenth possible implementation manner, N×N second liquid crystal plates are electrically controlled birefringence liquid crystals; and when a voltage applied to any second liquid crystal plate is greater than or equal to a second threshold voltage, a polarized state of output light of the any second liquid crystal plate is consistent with a polarized state of input light of the any second liquid crystal plate; or when a voltage applied to the any second liquid crystal plate is less than a second threshold voltage, if the left-handed circularly polarized light is input to the any second liquid crystal plate, the any second liquid crystal plate outputs the right-handed circularly polarized light, and if the right-handed circularly polarized light is input to the any second liquid crystal plate, the any second liquid crystal plate outputs the left-handed circularly polarized light.

The embodiments of the present invention provide a liquid crystal grating-based optical switching apparatus, including an input collimator, an input polarization beam splitter, an input quarter-wave plate, an N×N liquid crystal grating array, an output quarter-wave plate, an output polarization beam splitter, and an output collimator. After passing the input polarization beam splitter and the input quarter-wave plate, input light changes to circularly polarized light. A transmission path is selected for the light by changing a voltage of a liquid crystal grating, and the light is output to a specified port, passes the output quarter-wave plate and the output polarization beam splitter, and then is coupled into the output collimator, thereby implementing an N×N optical cross switch function and an optical add/drop multiplexing function. The transmission path is selected for the light by setting the voltage for the liquid crystal grating, which simplifies an optical switching apparatus, reduces costs, and decreases a size of a component. The following gives a description by using specific embodiments.

BRIEF DESCRIPTION OF THE DRAWINGS

To describe the technical solutions in the embodiments of the present invention or in the prior art more clearly, the following briefly describes the accompanying drawings required for describing the embodiments or the prior aft. Apparently, the accompanying drawings in the following description show merely some embodiments of the present invention, and a person of ordinary skill in the art may still derive other drawings from these accompanying drawings without creative efforts.

FIG. 12(a) and FIG. 12(b) and FIG. 12(c) and FIG. 12(d) are a schematic diagram of a process of making a polymer polarization grating;

FIG. 13 is a schematic diagram of a principle of a polymer polarization grating.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention provide a liquid crystal grating-based optical switching apparatus, including an input collimator, an input polarization beam splitter, an input quarter-wave plate, a liquid crystal grating, an output quarter-wave plate, an output polarization beam splitter, and an output collimator. After passing the input polarization beam splitter and the input quarter-wave plate, input light changes to circularly polarized light. A transmission path is selected for the light by changing a voltage of a liquid crystal grating, and the light is output to a specified port, passes the output quarter-wave plate and the output polarization beam splitter, and then is coupled into the output collimator, thereby implementing an N×N optical cross switch function and an optical add/drop multiplexing function. The transmission path is selected for the light by setting the voltage for the liquid crystal grating, which simplifies an optical switching apparatus, reduces costs, and decreases a size of a component. The following gives a description by using specific embodiments.

Embodiment 1

Figure 1:
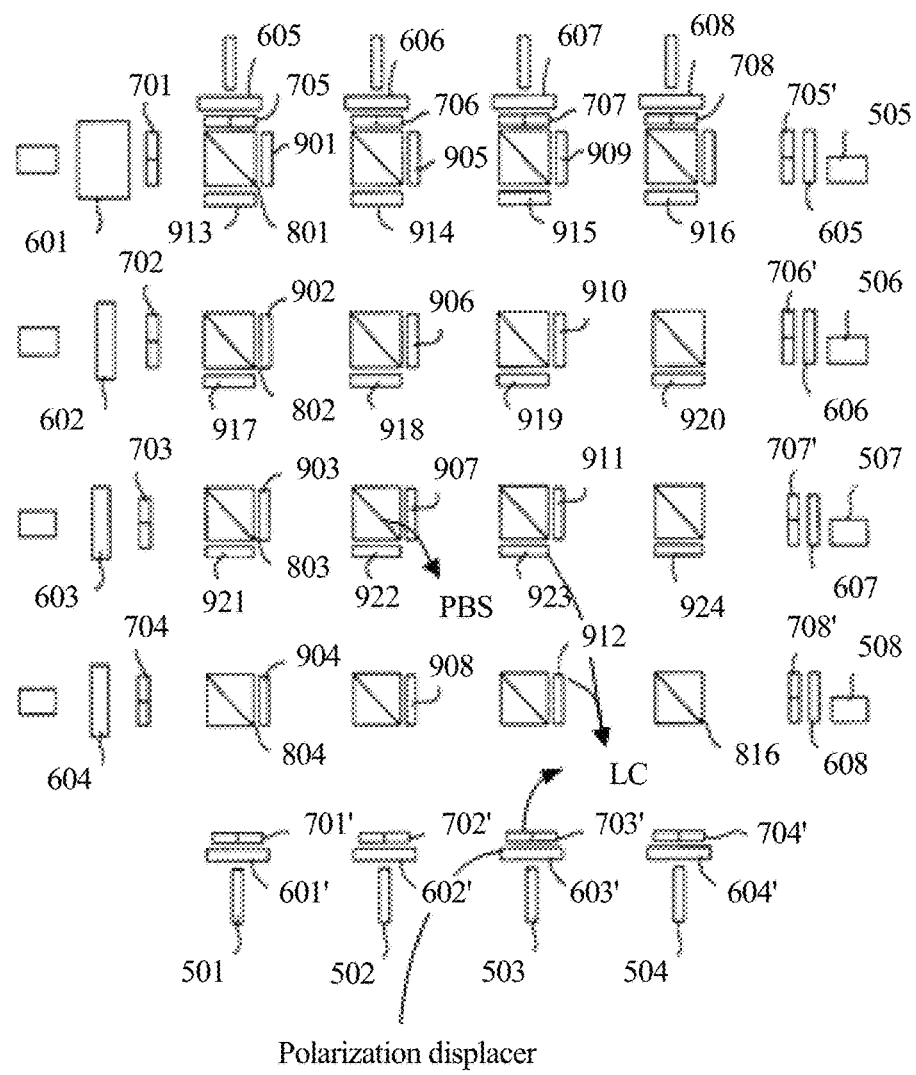
FIG. 1 is a schematic structural diagram of an optical switching apparatus in the prior art.
Figure 2:
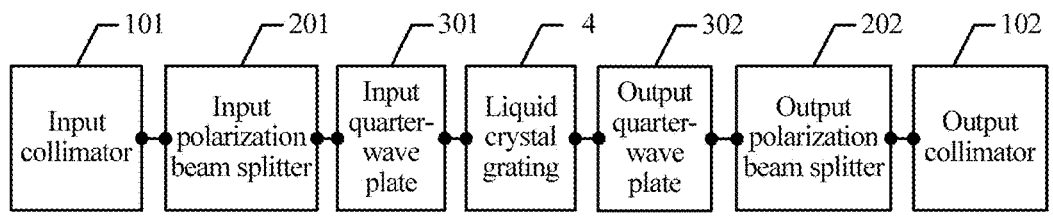
FIG. 2 is a schematic structural diagram of a liquid crystal grating-based optical switching apparatus according to Embodiment 1 of the present invention.

FIG. 2 is a schematic structural diagram of a liquid crystal grating-based optical switching apparatus according to Embodiment 1 of the present invention. As shown in the figure, the liquid crystal grating-based optical switching apparatus in this embodiment of the present invention includes an input collimator 101, an input polarization beam splitter 201, an input quarter-wave plate 301, an N×N liquid crystal grating 4 array, an output quarter-wave plate 302, an output polarization beam splitter 202, and an output collimator 102, where N is an integer greater than or equal to 2.

The input collimator 101 is configured to receive optical signals input from an optical fiber. The input collimator 101 is an incident port for peripheral optical signals. The optical signals pass an input optical fiber and enter the input collimator 101, and the input collimator 101 performs beam shaping on the input optical signals to enlarge beam waists and reduce divergence angles of the input optical signals, so that these input optical signals can be transmitted for a longer distance in free space.

The input polarization beam splitter 201 is disposed between the input collimator 101 and the input quarter-wave plate 301, and is configured to: split an input optical signal from the input collimator 101 into two optical signals having different polarization directions, and output, to the input quarter-wave plate 301, the two optical signals having different polarization directions. The polarization beam splitter 201 may be implemented by using multiple technologies, for example, implemented by using a birefringence crystal, a polarization multilayer film, a polymeric film, and quartz glass etching.

The input quarter-wave plate 301 is disposed between the input polarization beam splitter 201 and the N×N liquid crystal grating 4, and is configured to: receive the two optical signals having different polarization directions from the polarization beam splitter 201, convert the two optical signals having different polarization directions into circularly polarized light, and output the circularly polarized light to the N×N liquid crystal grating 4 array.

The N×N liquid crystal grating 4 array is disposed between the input quarter-wave plate 301 and the output quarter-wave plate 302, and is configured to: receive the circularly polarized light from the input quarter-wave plate 301 by using a liquid crystal grating that is in the N×N liquid crystal grating 4 array and that is corresponding to the input quarter-wave plate 301, and output the circularly polarized light to the selected output quarter-wave plate 302 through a selected transmission path, where the selected transmission path is selected by setting a voltage for a liquid crystal grating in the N×N liquid crystal grating 4 array.

The output quarter-wave plate 302 is disposed between the N×N liquid crystal grating 4 array and the output polarization beam splitter 202, and is configured to: receive the circularly polarized light from the N×N liquid crystal grating 4 array, convert the circularly polarized light into two optical signals having different polarization directions, and output, to the polarization beam splitter 202, the two optical signals having different polarization directions.

The output polarization beam splitter 202 is disposed between the output quarter-wave plate 302 and the output collimator 102, and is configured to perform polarization coupling on the two optical signals having different polarization directions from the output quarter-wave plate 302, to output the two optical signals having different polarization directions to the output collimator 102. An implementation manner of the output polarization beam splitter 202 is the same as an implementation manner of the input polarization beam splitter 201, and details are not described herein again.

The output collimator 102 is configured to receive the optical signal output by the output polarization beam splitter 202 and couple the received optical signal into an optical fiber for output.

This embodiment of the present invention provides a liquid crystal grating-based optical switching apparatus, including an input collimator 101, an input polarization beam splitter 201, an input quarter-wave plate 301, an N×N liquid crystal grating 4 array, an output quarter-wave plate 302, an output polarization beam splitter 202, and an output collimator 102. A transmission path is selected for an optical signal by changing a voltage of a liquid crystal grating, so that the optical signal is output to a selected output end. The optical switching apparatus with low costs has a simple structure and a small size.

Embodiment 2

Figure 3:
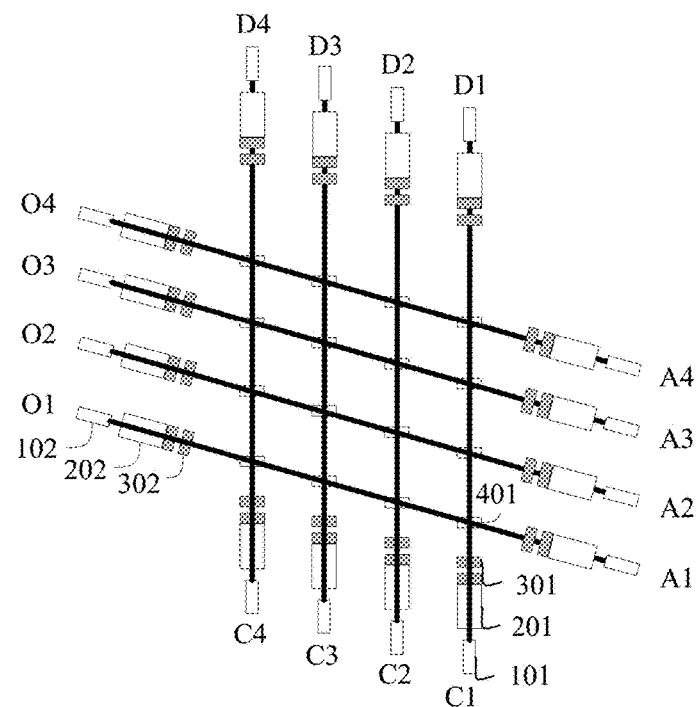
FIG. 3 is a specific schematic structural diagram of a switchable polarization grating-based optical switching apparatus according to Embodiment 2 of the present invention.

FIG. 3 is a specific schematic structural diagram of a switchable polarization grating-based optical switching apparatus according to Embodiment 2 of the present invention. As shown in FIG. 3, the switchable polarization grating-based optical switching apparatus in Embodiment 2 of the present invention includes an input collimator 101, an input polarization beam splitter 201, an input quarter-wave plate 301, an N×N switchable polarization grating 401 array, an output quarter-wave 302, an output polarization beam splitter 202, and an output collimator 102.

The input collimator 101 is configured to receive an optical signal input from an optical fiber, perform beam shaping on the optical signal input from the optical fiber, to output the optical signal to the input polarization beam splitter 201. Details have been described in the foregoing Embodiment 1 of the present invention as shown in FIG. 2, and are not described herein again.

The input polarization beam splitter 201 is configured to split the input optical signal from the input collimator 101 into two optical signals having different polarization directions, and output, to the input quarter-wave plate 301, the two optical signals having different polarization directions. Details have been described in the foregoing Embodiment 1 of the present invention as shown in FIG. 2, and are not described herein again.

The input quarter-wave plate 301 is configured to receive the two optical signals having different polarization directions from the input polarization beam splitter 201, convert the two optical signals having different polarization directions into circularly polarized light, and output the circularly polarized light to the N×N switchable polarization grating 401 array.

The N×N switchable polarization grating 401 array is disposed between the input quarter-wave plate 301 and the output quarter-wave plate 302, and is configured to: receive the circularly polarized light from the input quarter-wave plate 301, select a transmission path for the light by changing a voltage of the N×N switchable polarization grating 401 array, to output to the selected output quarter-wave plate 302.

Figure 4:
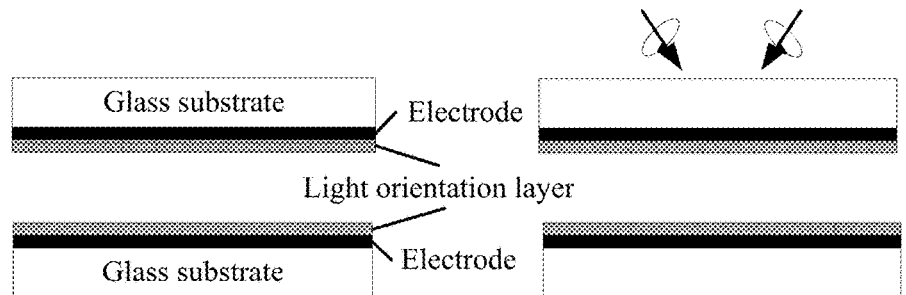
FIG. 4(a) and FIG. 4(b) are a schematic diagram of a process of making a liquid crystal alignment layer of a switchable polarization grating.
Figure 5:
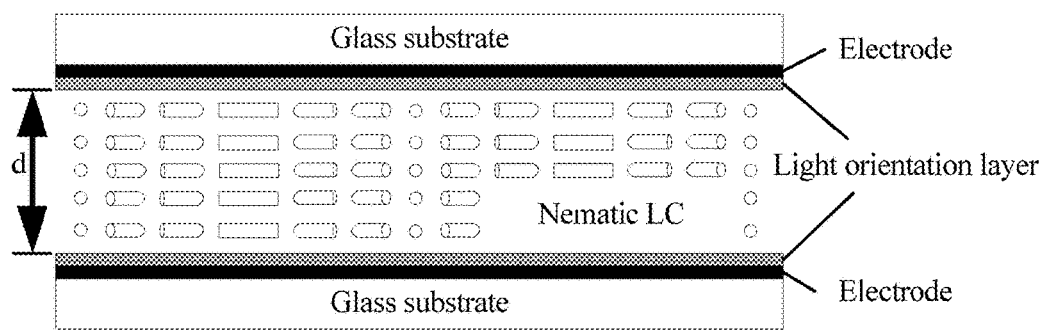
FIG. 5 is a schematic diagram of alignment of liquid crystal molecules when a voltage between both ends of a switchable polarization grating is 0V.
Figure 6:
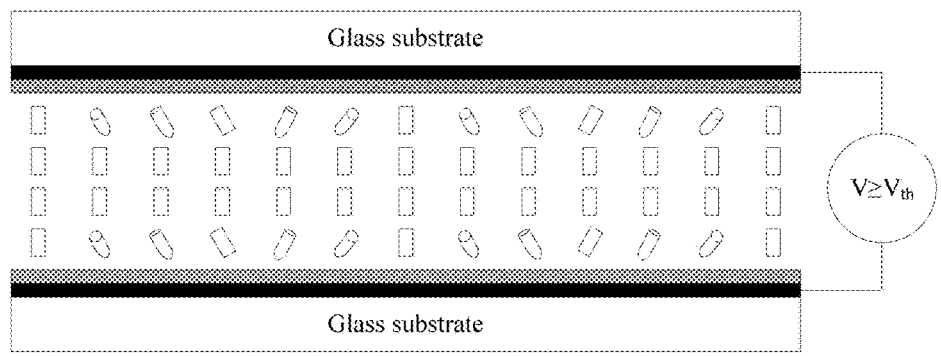
FIG. 6 is a schematic diagram of alignment of liquid crystal molecules when a voltage between both ends of a switchable polarization grating is greater than a first threshold voltage.

In a specific application, a structure and a process of making a switchable polarization grating (Switchable Polarization Grating, SPG) in the N×N switchable polarization grating 401 array are very similar to structure and a process of making a conventional liquid crystal plate (Liquid Crystal, LC). A main difference lies in making of a liquid crystal alignment layer. Generally, an alignment layer of a Nematic (nematic) LC is formed by brushing and wiping, by using nylon cloth, a polymer layer of a glass surface or is formed by exposuring the polymer layer to a single beam. As shown in FIG. 4, a liquid crystal alignment layer of an SPG is formed by exposing a polymer layer to two beams of ultraviolet coherent polarized light, for example, two beams of light on the top of FIG. 4(b), where one beam of light is right-handed circularly polarized light and the other beam is left-handed circularly polarized light. The liquid crystal alignment layer shown in FIG. 4 includes glass substrates, a light orientation layer, and electrodes. When a liquid crystal is injected between two glass substrates, orientations of liquid crystal molecules are aligned according to a holographic pattern formed at the alignment layer after the exposure. As shown in FIG. 5, when no voltage is applied between both ends of the SPG, the liquid crystal molecules form a liquid crystal grating that can diffract incident light. As shown in FIG. 6, when a voltage between both ends of the SPG is greater than or equal to a first threshold voltage $V_{th}$, the liquid crystal molecules deflect toward a direction of an electric field, and a grating effect disappears, where the first threshold voltage depends on selected liquid crystal molecules and the structure of the switchable polarization grating.

Specifically, for any switchable polarization grating in N×N switchable polarization gratings, when a voltage applied between both ends of the any switchable polarization grating is less than the first threshold voltage, liquid crystal molecules in the any switchable polarization grating form a liquid crystal grating to diffract incident light; or when a voltage between both ends of the any switchable polarization grating is greater than or equal to the first threshold voltage, liquid crystal molecules deflect toward a direction of an electric field caused by the voltage between both ends of the any switchable polarization grating, and a grating effect disappears.

In the N×N switchable polarization gratings, a voltage between both ends of a switchable polarization grating that does not need to deflect the incident light is set to being greater than or equal to the first threshold voltage, and a voltage between both ends of a switchable polarization grating that needs to deflect the incident light is set to being less than the first threshold voltage, where the switchable polarization grating that needs to deflect the incident light is a switchable polarization grating that is corresponding to the input quarter-wave plate and corresponding to the output quarter-wave plate 302, and the switchable polarization grating that does not need to deflect the incident light is a switchable polarization grating, except the switchable polarization grating that needs to deflect the incident light, in the N×N switchable polarization grating array 401.

Figure 7:
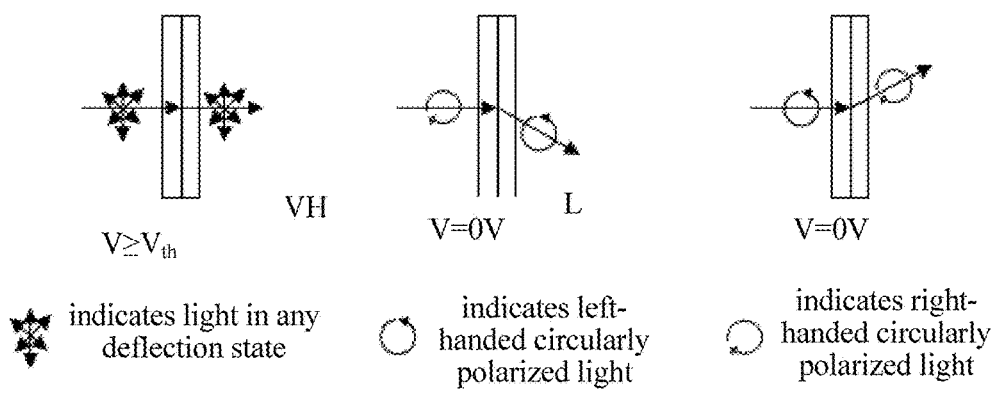
FIG. 7 is a schematic diagram of a principle of a switchable polarization grating.

The SPG has three diffraction levels: level 0, level +1, and level −1. A polarization beam splitter and a quarter-wave plate may decompose the incident light into left-handed circularly polarized light and right-handed circularly polarized light according to different polarized states of the incident light, and then the left-handed circularly polarized light and the right-handed circularly polarized light are respectively diffracted by the SPG to the levels ±1, as shown in FIG. 7. Specifically, when the voltage between both ends of the SPG is greater than or equal to the first threshold voltage $V_{th}$, after the incident light in any polarized state passes the SPG, the polarized state is unchanged and a propagation direction is unchanged; or when the voltage between both ends of the SPG is less than the first threshold voltage $V_{th}$, for example, V=0 V, the right-handed circularly polarized light is diffracted to the level +1 to change to the left-handed circularly polarized light, and the left-handed circularly polarized light is diffracted to the level −1 to change to the right-handed circularly polarized light.

Specifically, a 4×4 optical switching apparatus is used as an example. As shown in FIG. 3, C1, C2, C3, and C4 ports are incident ports; and O1, O2, O3, and O4 ports are output ports. If C1-O3, C2-O1, C3-O2, and C4-O4 cross connections are to be implemented, voltages need to be set for SPGs according to Table 1. For example, to implement C1-O3, only a voltage applied to an SPG located at a cross point of C1 and O3 needs to be set to zero, and a high voltage is applied to other SPGs. Specifically, the high voltage is greater than or equal to the first threshold voltage $V_{th}$. In this way, light is input from a collimator of C1, passes two SPGs with a transmission direction unchanged, then passes a third SPG (whose voltage is 0 V) and is diffracted to deflect toward O3, and finally is coupled into a collimator of O3, so as to implement transmission of the light from C1 to O3.

TABLE 1

Voltages set for SPGs to implement C1-O3, C2-O1, C3-O2, and C4-O4

| Table 1 | O1 | O2 | O3 | O4 |
|---|---|---|---|---|
| C4 | ON | ON | ON | OFF |
| C3 | ON | OFF | ON | ON |
| C2 | OFF | ON | ON | ON |
| C1 | ON | ON | OFF | ON |

This 4×4 optical switching apparatus has an optical add/drop multiplexing function. As shown in FIG. 3, A1, A2, A3, and A4 ports are add ports and are configured to add one or more wavelengths into an optical path; and D1, D2, D3, and D4 ports are drop ports and are configured to drop one or more wavelengths from an optical path. For example, to implement C1-O2, C2-O3, C3-D3, C4-O1, and A4-O4 cross connections, where light incident from C3 is sent to the Drop port D3 and light incident from A4 is added to the output port O4, voltages can be set for the SPGs according to Table 2.

TABLE 2

Voltages set for SPGs to implement C1-O2, C2-O3, C3-D3, C4-O1, A4-O4

| Table 2 | O1 | O2 | O3 | O4 | |
|---|---|---|---|---|---|
| C4 | OFF | ON | ON | ON | D4 |
| C3 | ON | ON | ON | ON | D3 |
| C2 | ON | ON | OFF | ON | D2 |
| C1 | ON | OFF | ON | ON | D1 |
| | A1 | A2 | A3 | A4 | |

The output quarter-wave plate 302 is configured to receive an optical signal from the N×N switchable polarization grating 401 array, convert the optical signal into two optical signals having different polarization directions, and output, to the polarization beam splitter 202, the two optical signals having different polarization directions. Details have been described in the foregoing Embodiment 1 of the present invention as shown in FIG. 2, and are not described herein again.

The output polarization beam splitter 202 is configured to receive the two optical signals having different polarization directions, and perform polarization coupling on the two optical signals having different polarization directions, to output the two optical signals having different polarization directions to the output collimator 102. The output polarization beam splitter 202 may be implemented by using multiple technologies, for example, implemented by using a birefringence crystal, a polarization multilayer film, a polymeric film, and quartz glass etching. Details have been described in the foregoing Embodiment 1 of the present invention as shown in FIG. 2, and are not described herein again.

The output collimator 102 is configured to receive the optical signal from the output polarization beam splitter 202 and couple the received optical signal into an optical fiber for output. Details have been described in the foregoing Embodiment 1 of the present invention as shown in FIG. 2, and are not described herein again.

This embodiment of the present invention provides a switchable polarization grating-based optical switching apparatus, including an input collimator 101, an input polarization beam splitter 201, an input quarter-wave plate 301, an N×N switchable polarization grating 401 array, an output quarter-wave plate 302, an output polarization beam splitter 202, and an output collimator 102. A transmission path is selected for an optical signal by setting a voltage for a switchable polarization grating 401, so that the optical signal is output to a selected output end. The optical switching apparatus with low costs has a simple structure and a small size.

Embodiment 3

Figure 8:
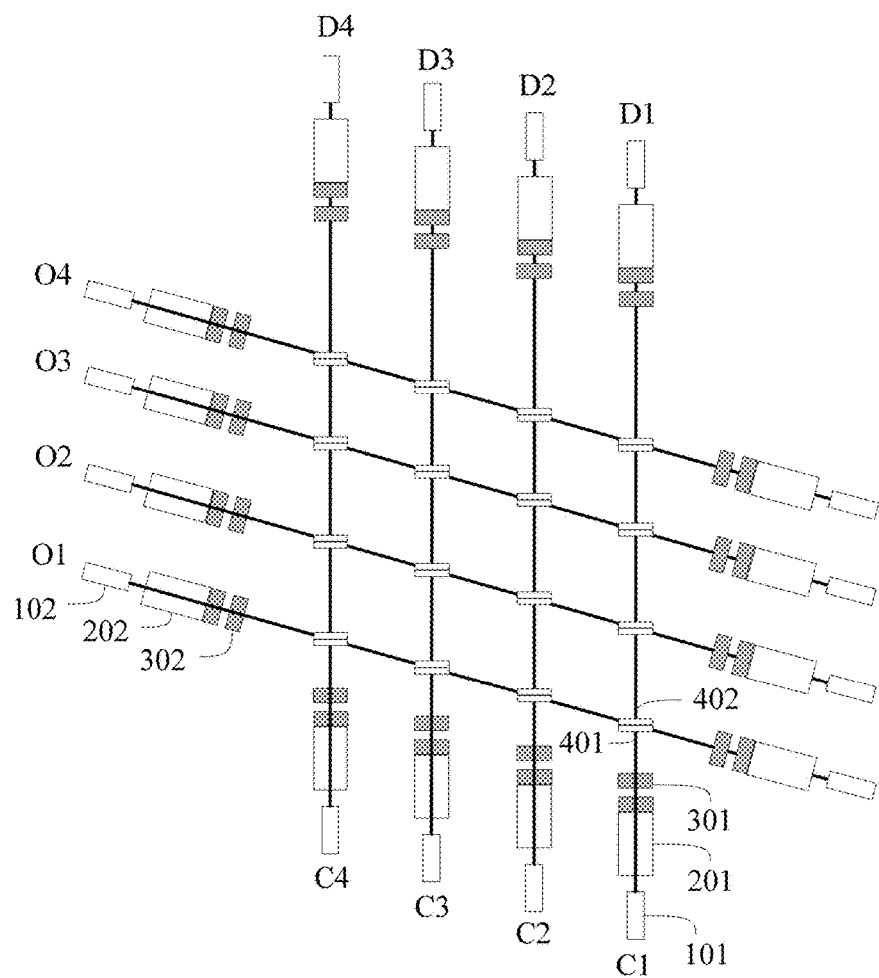
FIG. 8 is a specific schematic structural diagram of an optical switching apparatus that is based on a switchable polarization grating/liquid crystal plate according to Embodiment 3 of the present invention.

FIG. 8 is a specific schematic structural diagram of an optical switching apparatus that is based on a switchable polarization grating/liquid crystal plate according to Embodiment 3 of the present invention. As shown in FIG. 8, the optical switching apparatus that is based on a switchable polarization grating/liquid crystal plate in Embodiment 3 of the present invention includes an input collimator 101, an input polarization beam splitter 201, an input quarter-wave plate 301, an N×N switchable polarization grating 401/liquid crystal plate 402 array, an output quarter-wave plate 302, an output polarization beam splitter 202, and an output collimator 102.

A solution in this embodiment is similar to that in Embodiment 2, except that a liquid crystal plate 402 is added after each switchable polarization grating 401 to form a switchable polarization grating 401/liquid crystal plate 402 combination. A voltage of the N×N switchable polarization grating 401/liquid crystal plate 402 array is controlled, so that a circularly polarized state of cross-talk light is opposite to a circularly polarized state of signal light. After the cross-talk light passes the output quarter-wave plate 302, a polarized state of the cross-talk light is vertical to a polarized state of the signal light, so that the cross-talk light is blocked by the output polarization beam splitter at an output end. In this way, a signal-to-noise ratio can be increased significantly.

Specifically, the liquid crystal plate 402 in the optical switching apparatus in this embodiment is mainly configured to control a polarized state of light. Optionally, an alignment type of the liquid crystal plate may be an electrically controlled birefringence (Electrically Controlled Birefringence, ECB) type or a vertical alignment (Vertical Alignment, VA) type. An ECB-type liquid crystal, when $V<V_{th2}$, for example, V=0 V, is a birefringence crystal, and when $V \geq V_{th2}$, has no birefringence effect. A VA-type liquid crystal, when $V<V_{th2}$, for example, V=0 V, has no birefringence effect, and when $V \geq V_{th2}$, is a birefringence crystal. $V_{th2}$ is a second threshold voltage, and the second threshold voltage $V_{th2}$ depends on liquid crystal molecules in the liquid crystal plate and a structure of the liquid crystal plate.

Figure 9:
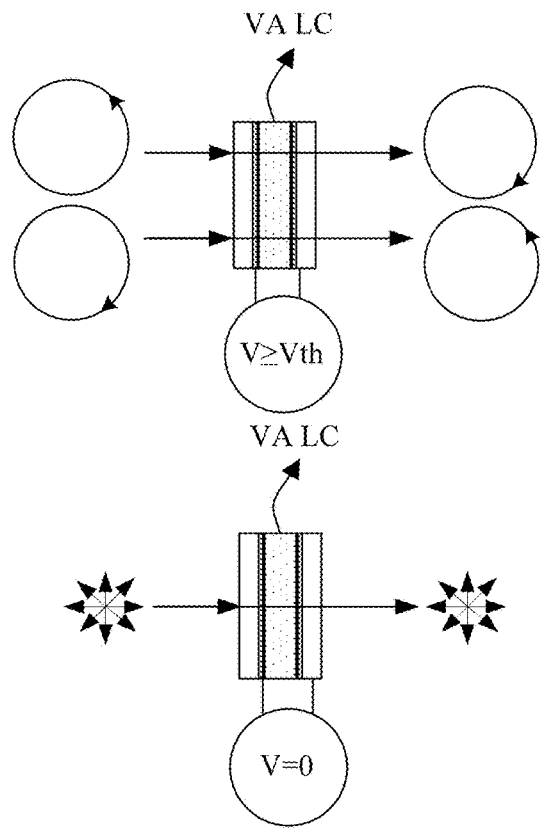
FIG. 9 is a schematic diagram of a principle of a vertical alignment VA type liquid crystal plate.

The VA type liquid crystal is used as an example. As shown in FIG. 9, an operating principle of the VA type liquid crystal is that: when an applied voltage is greater than or equal to the second threshold voltage $V_{th2}$, if left-handed circularly polarized light is input, right-handed circularly polarized light is output, and if right-handed circularly polarized light is input, left-handed circularly polarized light is output; or when the applied voltage is less than the second threshold voltage, for example, V=0 V, a polarized state of output light is consistent with a polarized state of input light.

Figure 10:
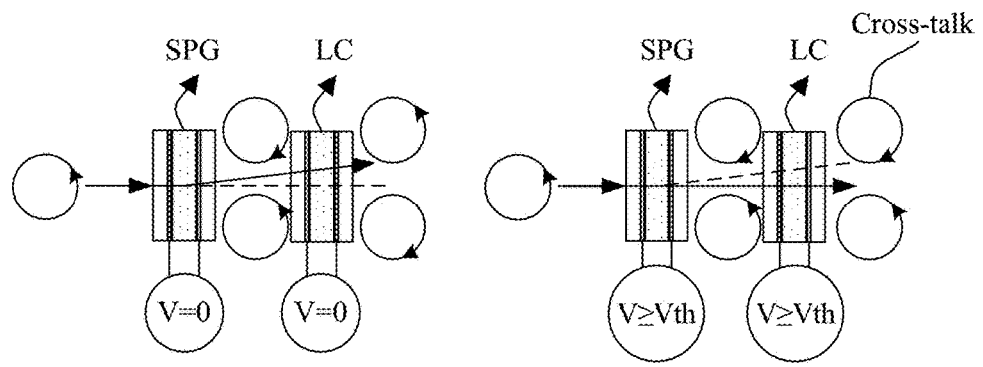
FIG. 10 is a schematic diagram of a principle of a switchable polarization grating/liquid crystal combination.

As shown in FIG. 10, after light passes an SPG, a polarization direction of signal light is the same as a polarization direction of cross-talk light. Therefore, in Embodiment 2, cross-talk light from another SPG is coupled into a channel of signal light, so that a signal-to-noise ratio is reduced. In this embodiment of the present invention, a liquid crystal plate LC 402 is added after an SPG plate. As shown in FIG. 10, a voltage of the liquid crystal plate is set, so that a circularly polarized state of the cross-talk light can always be opposite to a circularly polarized state of the signal light. In this way, after the cross-talk light passes the output quarter-wave plate, a polarized state of the cross-talk light is vertical to a polarized state of the signal light, so that the cross-talk light is blocked by the output polarization beam splitter. In this way, the signal-to-noise ratio can be increased significantly.

Being similar to the solution in Embodiment 2, N×N switchable polarization grating and liquid crystal plate combinations can implement an N×N optical cross function and have an Add/Drop function. An output path is selected by setting a voltage for a switchable polarization grating and a liquid crystal plate, and the optical cross function and the Add/Drop function can be further implemented. Details have been described in the foregoing Embodiment 2 of the present invention as shown in FIG. 3, and are not described herein again.

This embodiment of the present invention provides an optical switching apparatus that is based on a switchable polarization grating/liquid crystal plate, including an input collimator 101, an input polarization beam splitter 201, an input quarter-wave plate 301, an N×N switchable polarization grating 401/liquid crystal plate 402 array, an output quarter-wave plate 302, an output polarization beam splitter 202, and an output collimator 102. A transmission path is selected for an optical signal by setting a voltage for the N×N switchable polarization grating 401/liquid crystal plate 402 array, so that the optical signal is output to a selected output end. Such optical switching apparatus with low costs has a simple structure and a small size. In addition, a voltage of a liquid crystal plate is set, so that a polarized state of cross-talk light is vertical to a polarized state of signal light, and the cross-talk light is blocked by the output polarization beam splitter. In this way, a signal-to-noise ratio can be increased significantly.

Embodiment 4

Figure 11:
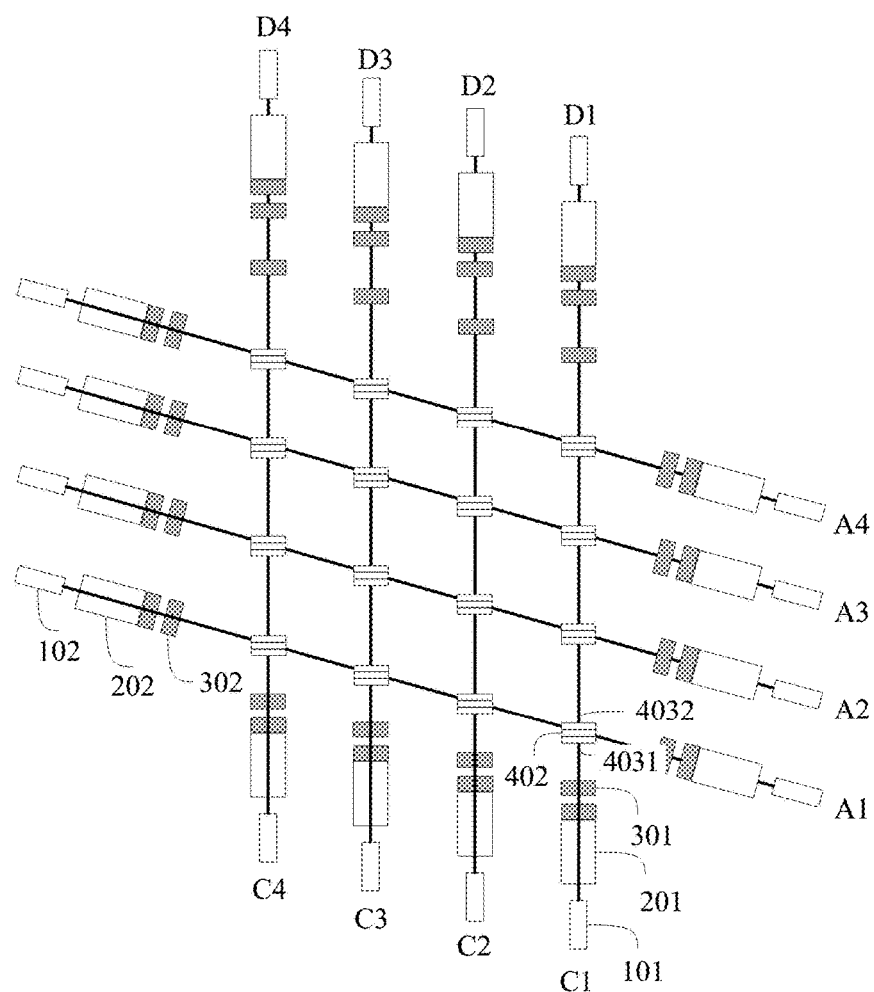
FIG. 11 is a specific schematic structural diagram of an optical switching apparatus that is based on a polymer polarization grating/liquid crystal plate/polymer polarization grating combination according to Embodiment 4 of the present invention.

FIG. 11 is a schematic structural diagram of an optical switching apparatus that is based on a polymer polarization grating/liquid crystal plate/polymer polarization grating combination according to Embodiment 4 of the present invention. As shown in FIG. 11, the optical switching apparatus that is based on a polymer polarization grating/liquid crystal plate/polymer polarization grating combination in Embodiment 4 of the present invention includes an input collimator 101, an input polarization beam splitter 201, an input quarter-wave plate 304 an N×N polymer polarization grating 4031/liquid crystal plate 402/polymer polarization grating 4032 array, an output quarter-wave plate 302, an output polarization beam splitter 202, and an output collimator 102.

A solution in this embodiment is similar to that in Embodiment 2, except that a switchable polarization grating 401 is replaced by a polymer polarization grating 4031/liquid crystal plate 402/polymer polarization grating 4032 combination, where "/" indicates an adjacent relationship between the former and the latter components of "/" in an optical transmission path, that is, an optical signal passes a polymer polarization grating 4031, and is output to a liquid crystal plate 402, and then is output to a polymer polarization grating 4032.

In a specific application, a process of making a polymer polarization grating (Polymer Polarization Grating, PPG) is shown in FIG. 12. First, a photosensitive polymer material (a light orientation material) is applied over a glass substrate (as shown in FIG. 12(a)). Then, two beams of coherent light are used to expose a photosensitive polymer layer to form a hologram (as shown in FIG. 12(b), and then a polymerizable liquid crystal is applied over a photosensitive layer (as shown in FIG. 12(c)). After that, uniform UV light is used to expose the polymerizable liquid crystal to solidify the polymerizable liquid crystal. In this case, liquid crystal molecules are aligned according to a holographic pattern of the photosensitive layer to form a fixed grating (as shown in FIG. 12(d)).

The PPG is a fixed grating, and therefore performance of the PPG cannot be changed by applying a voltage. As shown in FIG. 13, right-handed circularly polarized light is diffracted to level +1 to change to left-handed circularly polarized light, and left-handed circularly polarized light is diffracted to level −1 to change to right-handed circularly polarized light. Therefore, the PPG has only two directions for outputting light.

The liquid crystal plate 402 is configured to control, by setting a voltage between both ends of the liquid crystal plate 402, deflection of an optical signal incident into the liquid crystal plate 402.

Optionally, the liquid crystal plate 402 may be an ECB type liquid crystal or a VA type liquid crystal. For principles of the ECB type liquid crystal and the VA type liquid crystal, details have been described in the foregoing Embodiment 3 of the present invention as shown in FIG. 8, and are not described herein again.

N×N PPG/LC/PPG combinations can implement an N×N optical cross switch function. Specifically, 4×4 PPG/LC/PPG combinations are used as an example. As shown in FIG. 11, liquid crystal plates are VA type liquid crystals, or ECB type liquid crystals may be used. When a voltage applied to a liquid crystal plate is greater than or equal to a second threshold voltage, a polarization direction of light is changed, so that deflection of emergent light occurs. When a voltage applied to a liquid crystal plate is less than a second threshold voltage, specifically, if the applied voltage V=0 V, a polarization direction of light is not changed, so that emergent light is parallel to an optical axis. In this way, a 4×4 optical cross switch function and an Add/Drop function can be implemented by setting a voltage for a liquid crystal plate.

Optionally, if the liquid crystal plate 402 is a VA type liquid crystal plate, a voltage between both ends of a liquid crystal plate 402 that does not need to deflect incident light is set to being less than the second threshold voltage, and a voltage between both ends of a liquid crystal plate 402 that needs to deflect incident light is set to being greater than or equal to the second threshold voltage, where the liquid crystal plate 402 that needs to deflect the incident light is a liquid crystal plate that is corresponding to the input quarter-wave plate 301 and corresponding to the output quarter-wave plate 302, and the liquid crystal plate 402 that does not need to deflect the incident light is a liquid crystal plate 402, except the liquid crystal plate 402 that needs to deflect the incident light, in N×N liquid crystal plate 402 arrays.

Optionally, if the liquid crystal plate 402 is an ECB type liquid crystal plate, a voltage between both ends of a liquid crystal plate 402 that does not need to deflect incident light is set to being greater than or equal to the second threshold voltage, and a voltage between both ends of a liquid crystal plate 402 that needs to deflect incident light is set to being less than the second threshold voltage, where the liquid crystal plate 402 that needs to deflect the incident light is a liquid crystal plate that is corresponding to the input quarter-wave plate 301 and corresponding to the output quarter-wave plate 302, and the liquid crystal plate 402 that does not need to deflect the incident light is a liquid crystal plate, except the liquid crystal plate 402 that needs to deflect the incident light, in N×N liquid crystal plate 402 arrays.

As shown in FIG. 11, in the 4×4 PPG/LC/PPG combinations, C1, C2, C3, and C4 ports are incident ports; and O1, O2, O3, and O4 ports are output ports. Voltages only need to be set for liquid crystal plates according to Table 3 to implement C1-O3, C2-O1, C3-O2, and C4-O4 cross connections.

TABLE 3

Voltages set for an LC array to implement C1-O3, C2-O1, C3-O2, and C4-O4

| Table 3 | O1  | O2  | O3  | O4  |
|---------|-----|-----|-----|-----|
| C4      | OFF | OFF | OFF | ON  |
| C3      | OFF | ON  | OFF | OFF |
| C2      | ON  | OFF | OFF | OFF |
| C1      | OFF | OFF | ON  | OFF |

The optical switching apparatus can implement both the optical cross switch function and the Add/Drop function. As shown in FIG. 11, A1, A2, A3, and A4 ports are add ports and are configured to add one or more wavelengths into an optical path; and D1, D2, D3, and D4 ports are drop ports and are configured to drop one or more wavelengths from an optical path. For a function of each port, details are described in Embodiment 2, and are not described herein again. For example, to implement C1-O3, C2-O4, C3-D3, C4-O2, and A1-O1, voltages can be set for the LC array according to Table 4.

TABLE 4

Voltages set for the LC array to implement C1-O3, C2-O4, C3-D3, C4-O2, and A1-O1

| Table 4 | O1  | O2  | O3  | O4  |    |
|---------|-----|-----|-----|-----|----|
| C4      | OFF | ON  | OFF | OFF | D4 |
| C3      | OFF | OFF | OFF | OFF | D3 |
| C2      | OFF | OFF | OFF | ON  | D2 |
| C1      | OFF | OFF | ON  | OFF | D1 |
|         | A1  | A2  | A3  | A4  |    |

This embodiment of the present invention provides an optical switching apparatus that is based on a polymer polarization grating/liquid crystal plate/polymer polarization grating, including an input collimator 101, an input polarization beam splitter 201, an input quarter-wave plate 301, a PPG 4031/LC 402/PPG 4032, an output quarter-wave plate 302, an output polarization beam splitter 202, and an output collimator 102. A transmission path is selected for an optical signal by setting a voltage for a liquid crystal plate 402, so that the optical signal is output to a selected output end. The optical switching apparatus with low costs has a simple structure and a small size.

Embodiment 5

Figure 14:
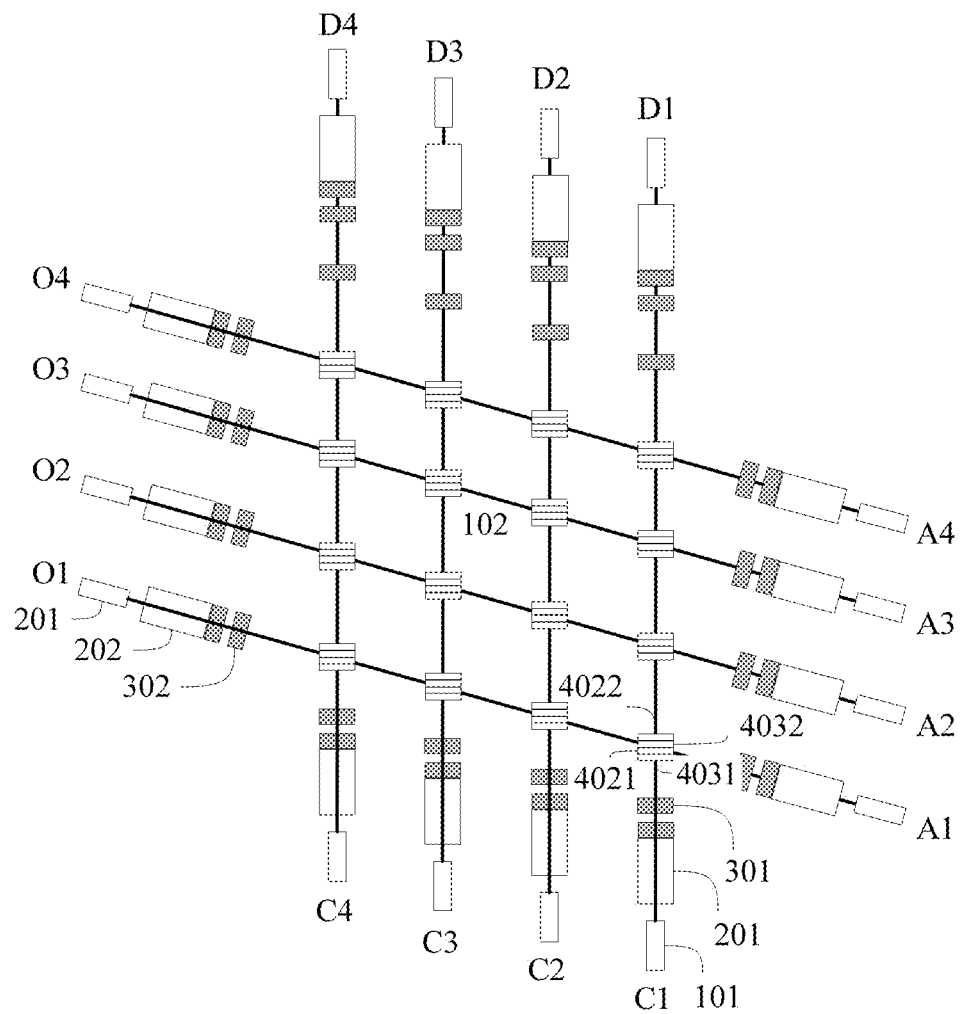
FIG. 14 is a specific schematic structural diagram of an optical switching apparatus that is based on a polymer polarization grating/liquid crystal plate/polymer polarization grating/liquid crystal plate combination according to Embodiment 5 of the present invention.

FIG. 14 is a schematic structural diagram of an optical switching apparatus that is based on a PPG/LC/PPG/LC according to Embodiment 5 of the present invention. As shown in FIG. 14, the optical switching apparatus that is based on a PPG/LC/PPG/LC in Embodiment 5 of the present invention includes an input collimator 101, an input polarization beam splitter 201, an input quarter-wave plate 301, an N×N PPG 4031/LC 4021/PPG 4032/LC 4022 array, an output quarter-wave plate 302, an output polarization beam splitter 202, and an output collimator 102.

A solution in this embodiment is similar to that in Embodiment 4, except that a liquid crystal plate 4022 is added after each polymer polarization grating 4031/liquid crystal plate 4021/polymer polarization grating 4032 to form a polymer polarization grating 4031/liquid crystal 4021/polymer polarization grating 4032/liquid crystal 4022 combination.

Optionally, a VA type may be selected as the liquid crystal plate, or an ECB type liquid crystal may be selected as the liquid crystal plate. For operating principles of the VA type liquid crystal and the ECB type liquid crystal, details are described in Embodiment 3, and are not described herein again. A principle for suppressing cross-talk light is similar to that in Embodiment 3, that is, a polarization direction of the cross-talk light is made opposite to a polarization direction of signal light, so that the cross-talk light is intercepted by the polarization beam splitter 202 at an output end. Therefore, a signal-to-noise ratio of the optical switching apparatus can be increased significantly.

This embodiment of the present invention provides an optical switching apparatus that is based on a PPG/LC/PPG/LC, including an input collimator 101, an input polarization beam splitter 201, an input quarter-wave plate 301, an N×N PPG 4031/LC 4021/PPG 4032/LC 4022 array, an output quarter-wave plate 302, an output polarization beam splitter 202, and an output collimator 102. A transmission path is selected for an optical signal by setting a voltage for an LC 4021, so that the optical signal is output to a selected output end. Such optical switching apparatus with low costs has a simple structure and a small size. In addition, a voltage is set for an LC 4022, so that a polarized state of cross-talk light is vertical to a polarized state of signal light, and the cross-talk light is blocked by the output polarization beam splitter. In this way, a signal-to-noise ratio can be increased significantly.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical switching apparatus comprising:
   an input collimator and an output collimator;
   an input polarization beam splitter;
   an input quarter-wave plate;
   an output quarter-wave plate;
   an output polarization beam splitter; and
   an N×N liquid crystal grating array, wherein N is an integer greater than or equal to 2,
   wherein the input polarization beam splitter is disposed between the input collimator and the input quarter-wave plate, the input polarization beam splitter configured to:
      split an input optical signal from the input collimator into two optical signals having different polarization directions, and
      output, to the input quarter-wave plate, the two optical signals having different polarization directions,
   wherein the input quarter-wave plate is disposed between the input polarization beam splitter and the N×N liquid crystal grating array, the input quarter-wave plate being configured to:
      receive the two optical signals having different polarization directions from the input polarization beam splitter,
      couple the two optical signals having different polarization directions into circularly polarized light, and output the circularly polarized light to the N×N liquid crystal grating array, wherein the N×N liquid crystal grating array is disposed between the input quarter-wave plate and the output quarter-wave plate, the N×N liquid crystal grating array being configured to:
receive the circularly polarized light from the input quarter-wave plate by using a liquid crystal grating that is in the N×N liquid crystal grating array and that corresponds to the input quarter-wave plate, and
output the circularly polarized light to the selected output quarter-wave plate through a selected transmission path, wherein the selected transmission path is selected by setting a voltage for a liquid crystal grating in the N×N liquid crystal grating array,
wherein the output quarter-wave plate is disposed between the N×N liquid crystal grating array and the output polarization beam splitter, the output quarter-wave plate being configured to:
split the circularly polarized light from the N×N liquid crystal grating array into two optical signals having different polarization directions, and
output, to the output polarization beam splitter, the two optical signals having different polarization directions, and
wherein the output polarization beam splitter is disposed between the output quarter-wave plate and the output collimator, the output polarization beam splitter being configured to couple, into the output collimator, the two optical signals having different polarization directions from the output quarter-wave plate.

2. The optical switching apparatus according to claim 1, wherein liquid crystal gratings in the N×N liquid crystal grating array comprise N×N switchable polarization gratings, N×N switchable polarization grating/liquid crystal plate combinations, N×N polymer polarization grating/liquid crystal plate/polymer polarization grating combinations, or N×N polymer polarization grating/liquid crystal plate/polymer polarization grating/liquid crystal plate combinations.

3. The optical switching apparatus according to claim 1, wherein the liquid crystal gratings in the N×N liquid crystal grating array comprise the N×N switchable polarization gratings for any switchable polarization grating in the N×N switchable polarization gratings,
when a voltage, applied between both ends of the any switchable polarization grating, is less than a first threshold voltage, liquid crystal molecules in the any switchable polarization grating form a liquid crystal grating to diffract incident light, or
when a voltage, applied between both ends of the any switchable polarization grating, is greater than or equal to a first threshold voltage, the liquid crystal molecules deflect toward a direction of an electric field caused by the voltage between both ends of the any switchable polarization grating, and a grating effect disappears, and
wherein in the N×N switchable polarization gratings, a voltage between both ends of a switchable polarization grating, which does not deflect the incident light, is set to being greater than or equal to the first threshold voltage, and a voltage between both ends of a switchable polarization grating, which deflects the incident light is set to being less than the first threshold voltage, and
wherein the switchable polarization grating that deflects the incident light is a switchable polarization grating that corresponds to the input quarter-wave plate and that corresponds to the output quarter-wave plate, and the switchable polarization grating that does not deflect the incident light is a switchable polarization grating, except the switchable polarization grating that deflects the incident light, in an N×N switchable polarization grating array.

4. The optical switching apparatus according to claim 3, wherein the voltage between both ends of the switchable polarization grating that needs to deflect the incident light is set to zero.

5. The optical switching apparatus according to claim 3, wherein when the voltage, applied between both ends of the any switchable polarization grating, is less than the first threshold voltage, the any switchable polarization grating has three diffraction levels: level 0, level +1, and level −1, wherein incident right-handed circularly polarized light is diffracted by the any switchable polarized grating to the level +1 to change to left-handed circularly polarized light, and wherein incident left-handed circularly polarized light is diffracted by the any switchable polarized grating to the level −1 to change to right-handed circularly polarized light.

6. The optical switching apparatus according to claim 3, wherein the liquid crystal gratings in the N×N liquid crystal grating array further comprise N×N liquid crystal plates, each liquid crystal plate corresponding to each switchable polarization grating to form a switchable polarization grating/liquid crystal plate combination, and each liquid crystal plate is configured to control a polarized state of an optical signal incident into the liquid crystal plate so that, after signal light and cross-talk light from a switchable polarization grating corresponding to the liquid crystal plate pass the liquid crystal plate, a circularly polarized state of output signal light is opposite to a circularly polarized state of output cross-talk light, and wherein the polarized state of the optical signal incident into the liquid crystal plate is controlled by setting a voltage between both ends of the liquid crystal plate.

7. The optical switching apparatus according to claim 6, wherein the N×N liquid crystal plates are vertical alignment type liquid crystals,
when a voltage applied to any liquid crystal plate is less than a second threshold voltage, a polarized state of output light of the any liquid crystal plate is consistent with a polarized state of input light of the any liquid crystal plate, or
when a voltage applied to the any liquid crystal plate is greater than or equal to a second threshold voltage, if the left-handed circularly polarized light is input to the any liquid crystal plate, the any liquid crystal plate outputs the right-handed circularly polarized light, and if the right-handed circularly polarized light is input to the any liquid crystal plate, the any liquid crystal plate outputs the left-handed circularly polarized light.

8. The optical switching apparatus according to claim 6, wherein the N×N liquid crystal plates are electrically controlled birefringence type liquid crystals,
when a voltage applied to any liquid crystal plate is greater than or equal to a second threshold voltage, a polarized state of output light of the any liquid crystal plate is consistent with a polarized state of input light of the any liquid crystal plate, or
when a voltage applied to the any liquid crystal plate is less than a second threshold voltage, if the left-handed circularly polarized light is input to the any liquid crystal plate, the any liquid crystal plate outputs the right-handed circularly polarized light, and if the right-handed circularly polarized light is input to the any liquid crystal plate, the any liquid crystal plate outputs the left-handed circularly polarized light.

9. The optical switching apparatus according to claim 1, wherein the liquid crystal gratings in the N×N liquid crystal grating array comprise the N×N polymer polarization grating/liquid crystal plate/polymer polarization grating combinations, wherein the polymer polarization grating/liquid crystal plate/polymer polarization grating combination comprises a first polymer polarization grating, a first liquid crystal plate, and a second polymer polarization grating,
  wherein both the first polymer polarization grating and the second polymer polarization grating are fixed gratings,
  wherein, if a right-handed circularly polarized light is input, the right-handed circularly polarized light is diffracted by the first polymer polarization grating or the second polymer polarization grating to level +1 to output left-handed circularly polarized light, and if a left-handed circularly polarized light is input, the left-handed circularly polarized light is diffracted by the first polymer polarization grating or the second polymer polarization grating to level −1 to output right-handed circularly polarized light, and
  wherein the first liquid crystal plate is configured to control, by setting a voltage between both ends of the first liquid crystal plate, deflection of an optical signal incident into the first liquid crystal plate.

10. The optical switching apparatus according to claim 9, wherein the first liquid crystal plate is a vertical alignment liquid crystal,
  when the voltage applied to the first liquid crystal plate is less than a second threshold voltage, a polarized state of output light of the first liquid crystal plate is consistent with a polarized state of input light of the first liquid crystal plate, or
  when the voltage applied to the first liquid crystal plate is greater than or equal to a second threshold voltage, if the left-handed circularly polarized light is input to the first liquid crystal plate, the first liquid crystal plate outputs the right-handed circularly polarized light, and if the right-handed circularly polarized light is input to the first liquid crystal plate, the first liquid crystal plate outputs the left-handed circularly polarized light, and
  wherein a voltage between both ends of a first liquid crystal plate that does not need to deflect incident light is set to being less than the second threshold voltage, and a voltage between both ends of a first liquid crystal plate that needs to deflect incident light is set to being greater than or equal to the second threshold voltage, wherein the first liquid crystal plate that needs to deflect the incident light is the first liquid crystal plate that is corresponding to the input quarter-wave plate and corresponding to the output quarter-wave plate, and the first liquid crystal plate that does not need to deflect the incident light is a first liquid crystal plate, except the first liquid crystal plate that needs to deflect the incident light, in N×N first liquid crystal plate arrays.

11. The optical switching apparatus according to claim 9, wherein the first liquid crystal plate is an electrically controlled birefringence liquid crystal,
  when the voltage applied to the first liquid crystal plate is greater than or equal to a second threshold voltage, a polarized state of output light of the first liquid crystal plate is consistent with a polarized state of input light of the first liquid crystal plate, or
  when the voltage applied to the first liquid crystal plate is less than a second threshold voltage, if the left-handed circularly polarized light is input to the first liquid crystal plate, the first liquid crystal plate outputs the right-handed circularly polarized light, and if the right-handed circularly polarized light is input to the first liquid crystal plate, the first liquid crystal plate outputs the left-handed circularly polarized light, and
  wherein a voltage between both ends of the first liquid crystal plate that does not need to deflect incident light is set to being greater than or equal to the second threshold voltage, and a voltage between both ends of a first liquid crystal plate that needs to deflect incident light is set to being less than the second threshold voltage, wherein the first liquid crystal plate that needs to deflect the incident light is the first liquid crystal plate that is corresponding to the input quarter-wave plate and corresponding to the output quarter-wave plate, and the first liquid crystal plate that does not need to deflect the incident light is a first liquid crystal plate, except the first liquid crystal plate that needs to deflect the incident light, in N×N first liquid crystal plate arrays.

12. The optical switching apparatus according to claim 9, wherein the liquid crystal gratings in the N×N liquid crystal grating array further comprise N×N second liquid crystal plates, each second liquid crystal plate and each polymer polarization grating/liquid crystal plate/polymer polarization grating combination form a polymer polarization grating/liquid crystal plate/polymer polarization grating/liquid crystal plate combination, each second liquid crystal plate is configured to control a polarized state of an optical signal incident into the second liquid crystal plate, so that after signal light and cross-talk light from a polymer polarization grating/liquid crystal plate/polymer polarization grating corresponding to the second liquid crystal plate pass the second liquid crystal plate, a circularly polarized state of output signal light is opposite to a circularly polarized state of output cross-talk light, wherein the polarized state of the optical signal incident into the second liquid crystal plate is controlled by setting a voltage between both ends of the second liquid crystal plate.

13. The optical switching apparatus according to claim 12, wherein the N×N second liquid crystal plates are vertical alignment liquid crystals,
  when a voltage applied to any second liquid crystal plate is less than a second threshold voltage, a polarized state of output light of the any second liquid crystal plate is consistent with a polarized state of input light of the any second liquid crystal plate, or
  when a voltage applied to the any second liquid crystal plate is greater than or equal to a second threshold voltage, if the left-handed circularly polarized light is input to the any second liquid crystal plate, the any second liquid crystal plate outputs the right-handed circularly polarized light, and if the right-handed circularly polarized light is input to the any second liquid crystal plate, the any second liquid crystal plate outputs the left-handed circularly polarized light.

14. The optical switching apparatus according to claim 12, wherein the N×N second liquid crystal plates are electrically controlled birefringence liquid crystals,
  when a voltage applied to any second liquid crystal plate is greater than or equal to a second threshold voltage, a polarized state of output light of the any second liquid crystal plate is consistent with a polarized state of input light of the any second liquid crystal plate, or
  when a voltage applied to the any second liquid crystal plate is less than a second threshold voltage, if the left-handed circularly polarized light is input to the any second liquid crystal plate, the any second liquid crystal plate outputs the right-handed circularly polarized light, and if the right-handed circularly polarized light is input to the any second liquid crystal plate, the any second liquid crystal plate outputs the left-handed circularly polarized light.

\* \* \* \* \*